(12) United States Patent  
Marriott et al.

(10) Patent No.: US 8,002,358 B2  
(45) Date of Patent: Aug. 23, 2011

(54) SEATBELT SYSTEM

(75) Inventors: Brandon Marriott, Waterford, MI (US); Paul Smith, Davison, MI (US); Thomas Grzybowski, Fraser, MI (US); Thomas Messner, Grand Blanc, MI (US)

(73) Assignee: TK Holdings Inc., Auburn Hills, MI (US)

( * ) Notice: Subject to any disclaimer, the term of this patent is extended or adjusted under 35 U.S.C. 154(b) by 523 days.

(21) Appl. No.: 12/149,092

(22) Filed: Apr. 25, 2008

(65) Prior Publication Data

US 2008/0309111 A1  Dec. 18, 2008

Related U.S. Application Data

(60) Provisional application No. 60/929,189, filed on Jun. 18, 2007.

(51) Int. Cl.  
*B60N 22/00* (2006.01)

(52) U.S. Cl. .......................... 297/473; 297/482; 280/808

(58) Field of Classification Search .................. 297/473, 297/483, 482, 464, 468; 280/804, 808; 296/63  
See application file for complete search history.

(56) References Cited

U.S. PATENT DOCUMENTS

| | | | | |
|---|---|---|---|---|
| 5,358,310 A * | 10/1994 | Nemoto | ........................ | 297/483 |
| 5,971,490 A * | 10/1999 | Chang | ............................ | 297/473 |
| 6,123,391 A * | 9/2000 | Boelstler et al. | ............. | 297/464 |
| 6,312,056 B1 * | 11/2001 | Murphy et al. | ............... | 297/464 |

* cited by examiner

*Primary Examiner* — Milton Nelson, Jr.  
(74) *Attorney, Agent, or Firm* — Foley & Lardner LLP

(57) ABSTRACT

A seatbelt system for a bench seat is provided. The seatbelt system includes a first seatbelt device that includes seatbelt webbing with a latch, a buckle to receive the latch, and at least one adjustable turning loop that is configured to adjust the vertical position of the adjustable turning loop and, thus, the webbing for the seatbelt. The adjustable turning loop includes a continuous, folding cover to conceal the structural components of the adjuster mechanism and rail assembly and to protect these components from debris and undesirable interaction with the occupant.

33 Claims, 20 Drawing Sheets

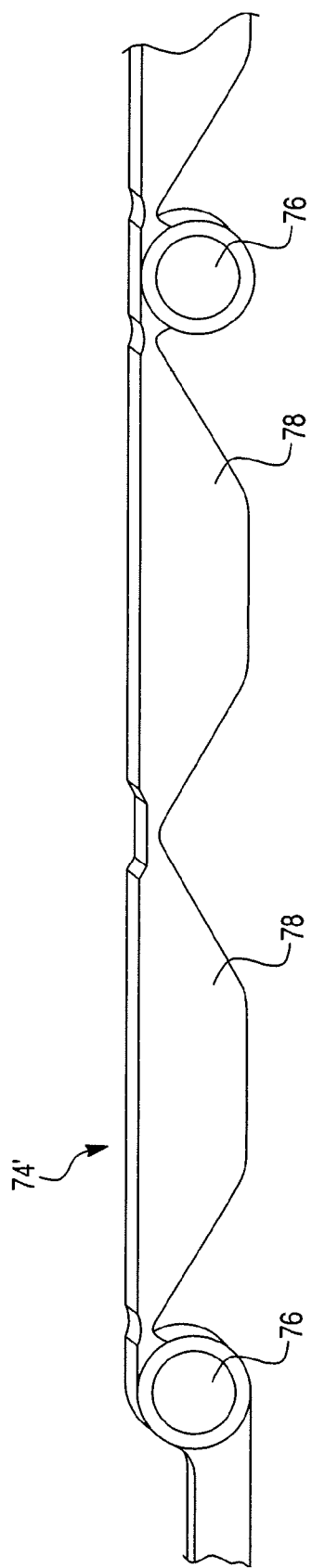

SEATBELT SYSTEM

CROSS-REFERENCE TO RELATED PATENT APPLICATIONS

This application claims the benefit of and priority to U.S. Provisional Application No. 60/929,189, filed Jun. 18, 2007, which is incorporated herein by reference in its entirety.

BACKGROUND

The present disclosure relates generally to the field of safety belts. More specifically, the disclosure relates to a safety seatbelt system for a bench-type seat that includes an adjustable turning loop to accommodate occupants of different sizes. The adjustable turning loop includes an integrated and continuous folding cover to conceal the structural components of the adjustable turning loop.

School buses are designed using a theory of compartmentalization, or closely-spaced, well-padded seats with energy-absorbing seatbacks. "Compartmentalization" provides protection for the passengers of the bus in a frontal impact or a rear impact. However, seatbelts are desirable to reduce the likelihood and severity of injuries, both fatal and non-fatal, to bus passengers in side impact or rollover accidents. Studies show that simple two-point seatbelts are more likely to cause head and/or neck injuries to occupants in a bus that only meets the "compartmentalization" standard. Therefore, it would be desirable to provide three-point seatbelt systems to protect the passengers of the bus in side impact or rollover accidents. Many states have, or are considering, laws that require buses, including school buses, to have lap and/or shoulder seatbelts.

People of a wide variety of sizes currently ride in buses today, including school buses, and both children and adults may be transported in the same vehicle. Buses generally include bench-type seats for passengers. With currently available designs, equipping buses with three-point seatbelt systems reduces the seating capacity from three persons in a seat to two persons in a seat. This can place a burden on bus operators because of the increase in the number of buses that may be needed to offset a reduction in bus capacity. Additionally, there is a need to be able to adjust the three-point seatbelt to accommodate an adult and a child. Devices such as "comfort clips" or other non-structural webbing routing devices are known to adjust a three-point seatbelt so that the belt will comfortably fit a child. These non-structural webbing routing devices may not be able to withstand the forces applied to the belt in an impact and fail, or slide along the webbing, which allows the webbing to shift into a less safe position across the head or neck of smaller occupants. Therefore, it would be desirable to provide a seatbelt system that adjusts to occupant size through the use of a structural adjustable anchorage instead of having a fixed anchorage configured for an adult.

SUMMARY

According to one exemplary embodiment, a seatbelt guide unit module is provided. The guide unit module comprises an adjustable turning loop assembly that includes: a housing; a rail; a slider assembly coupled to the rail; a loop pivot device coupled to the slider assembly, the loop pivot device receives a seatbelt webbing; a movable web cover for the turning loop assembly; and a cover track. The cover moves along the track in the housing. The cover is a continuous cover configured to hide components of the adjustable turning loop assembly from view within a passenger compartment in a vehicle.

According to another exemplary embodiment, a bench-type seat for a vehicle is provided. The seat comprises: a seatback; a seat bottom; and at least one adjustable turning loop assembly such that a turning loop is capable of moving from a topmost position proximate a top of the seatback down to a lower portion of the seatback. The adjustable turning loop assembly includes: a rail coupled to the seat frame; a slider assembly coupled to the rail; a loop pivot device coupled to the slider, the loop pivot device receives seatbelt webbing; a housing; and a cover assembly to prevent access to an interior of the adjustable turning loop assembly.

According to yet another exemplary embodiment, a seatbelt guide unit module is provided. The module comprises an adjustable turning loop assembly that includes: a housing; a rail; a slider assembly coupled to the rail; a seatbelt guide loop device coupled to the slider assembly, the guide loop device being configured to receive seatbelt webbing; a movable cover for the turning loop assembly; and a cover track. The cover moves along the track in the housing. The cover is a movable cover configured to hide components of the adjustable turning loop assembly from view within a passenger compartment in a vehicle.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 9F is a detail view of an accordion style adjustable loop cover according to another embodiment.

FIG. 13A is an isometric view of an adjustable turning loop actuator; FIG. 13B is an isometric view of a sliding trim plate; FIG. 13C is an isometric view of a sliding cover; FIG. 13D is an isometric view of an adjustable turning loop button; FIG. 13E is an isometric view of a button cover; FIG. 13F is an isometric view of a webbing exit bezel; and FIG. 13G is an isometric view of an adjustable turning loop cover housing with guide track.

DETAILED DESCRIPTION

Figure 1:
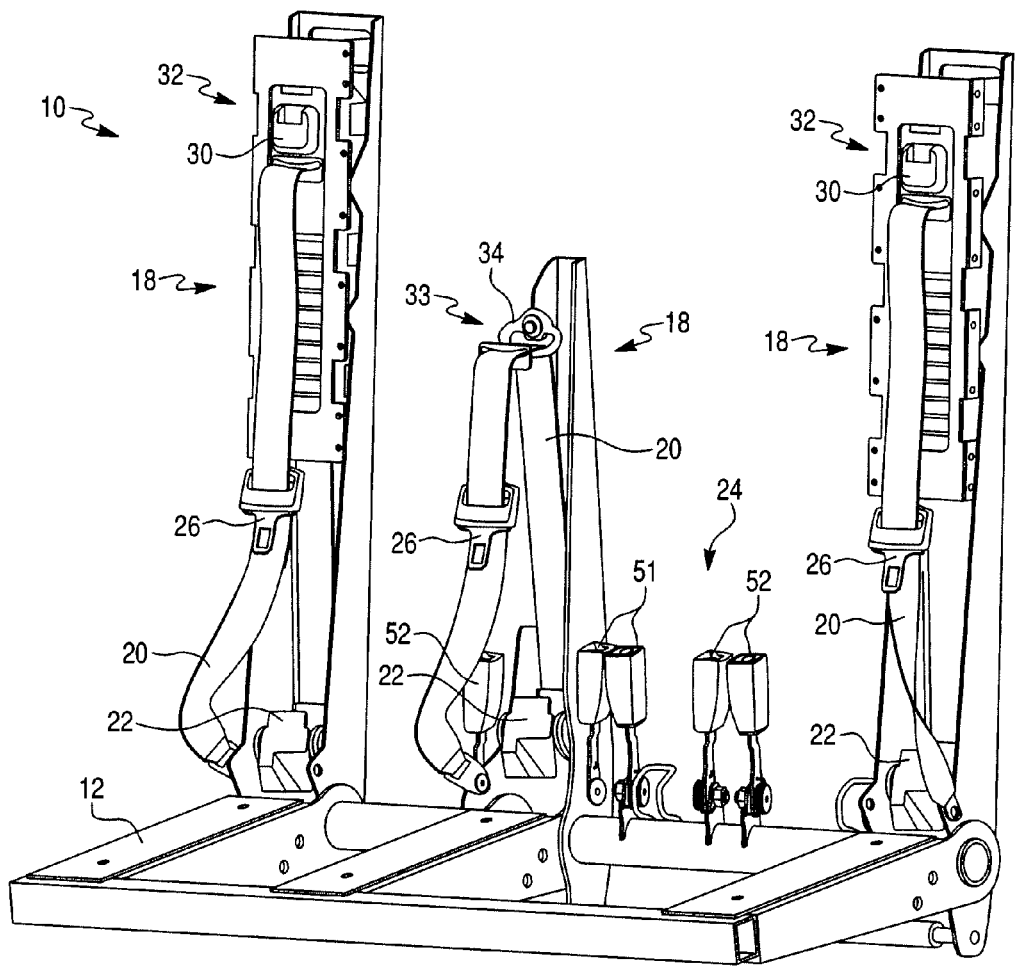
FIG. 1 is a front isometric view of a frame for a bench seat including an adjustable turning loop according to an exemplary embodiment.

According to embodiments, an adjustable turning loop would allow three children to be seated together on one bench-type seat without sacrificing seatbelt comfort or safety.

School buses are unique because the entire seatbelt system is attached to the seat, as opposed to most other vehicles, such as trucks or automobiles, which typically have an adjustable upper anchorage located on the B-pillar, C-pillar, etc. Structural adjustable turning loops have the disadvantage of requiring a large opening in the A-surface of the seat or B-pillar, C-pillar, etc., to allow the webbing to exit from behind the seat or trim surface along the entire travel distance of the adjustable turning loop. These openings are both visually unappealing and a potential safety hazard. Without a moveable cover over the opening, passengers' fingers could get pinched in the adjustable turning loop mechanism, debris that could render the adjustable turning loop non-functional could be introduced into the opening, etc. Some vehicle or seat environments do not allow a large, rigid sliding trim cover to be packaged with the adjustable turning loop to hide the required opening in the seat surface or trim due to packaging constraints, specifically in cases where the adjustable turning loop is mounted near the roof of a vehicle or the top of a seat. In these cases, generally, non-moving gap hiders, such as flexible bristles, a rubber or rubber-like flap, etc., have been used to conceal the adjustable turning loop opening. These devices do not prevent passengers' fingers, etc., from being placed in the adjustable turning loop opening, nor do they prevent debris, etc. from being pushed into the adjustable loop opening. Therefore, it would be desirable to provide a compact adjustable turning loop cover design that uses a continuous, folding cover to conceal the structural components of the adjuster mechanism and rail assembly from the passenger's view, as well as prevent undesirable interaction between the passenger and the adjustable turning loop mechanism.

According to one exemplary embodiment, a seatbelt system for a bench seat is provided. The seatbelt system comprises a first seatbelt device that includes seatbelt webbing with a latch, a buckle to receive the latch, and at least one adjustable turning loop that is configured to adjust the vertical position of the adjustable turning loop and, thus, the webbing for the seatbelt.

In another embodiment, the adjustable turning loop is positioned in a recess in a seatback of the bench seat.

In yet another embodiment, the seatbelt system includes a second seatbelt device that includes a webbing with a latch, a buckle to receive the latch, and a fixed position turning loop.

In yet another embodiment, the adjustable turning loop includes a continuous, folding cover to hide the structural components of an adjuster mechanism and rail assembly from occupants' view, as well as prevent undesirable interaction between the occupant the adjustable turning loop mechanism.

Figure 2:
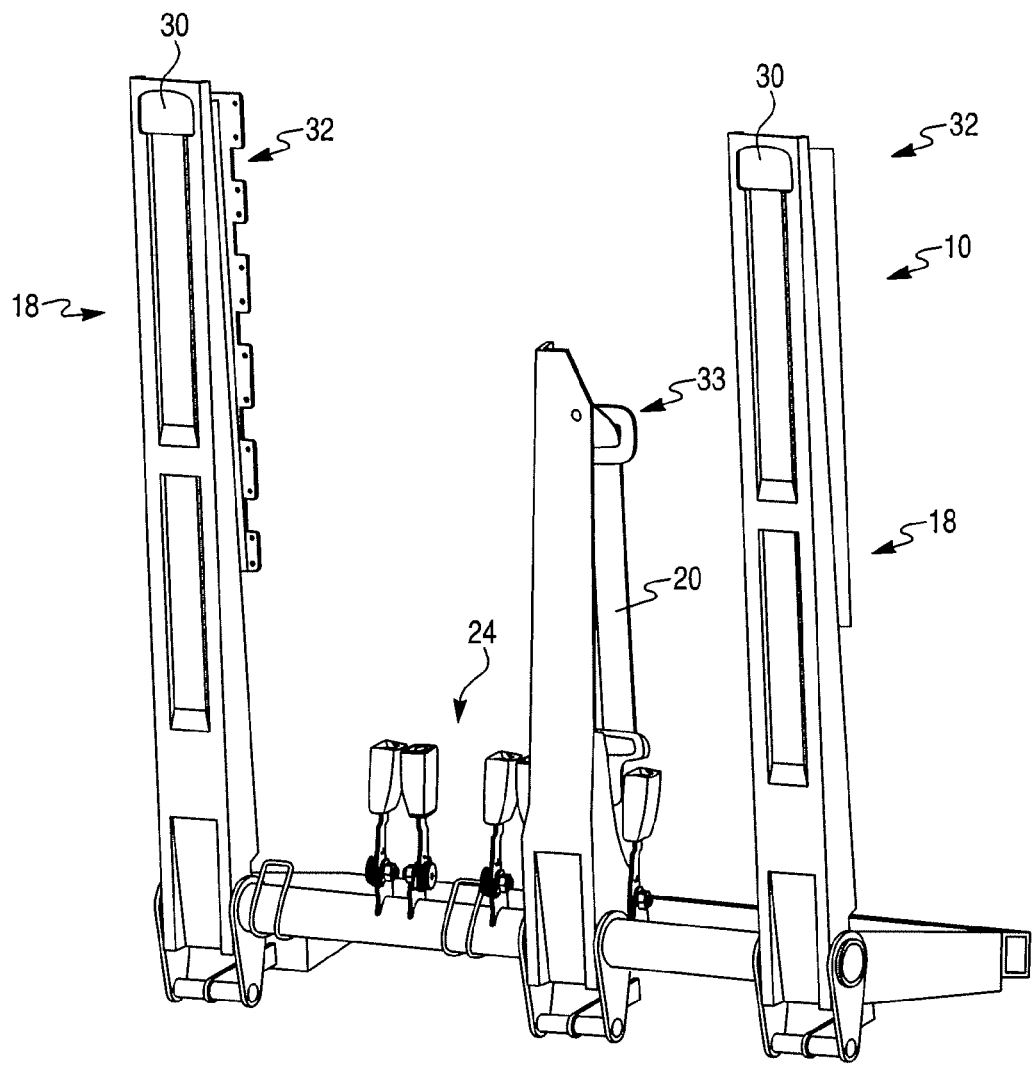
FIG. 2 is a rear isometric view of a frame for a bench seat including an adjustable turning loop of FIG. 1.

Referring in general to the FIGURES and in particular to FIGS. 1 and 2, a bench-type bus seat 10 is shown according to an exemplary embodiment. FIGS. 1 and 2 show the frame of the bus seat 10. The bench seat 10 includes a lower portion or seat bottom 12, an upper portion or seatback 14, and a plurality of seatbelt assemblies 18. Generally, a plurality of bench seats are coupled to the floor structure of a bus or other vehicle. The bench seats are configured to provide seating for one or more occupants.

The seatbelt assemblies 18 are provided to help retain an occupant in the bench seat during an impact or collision. The seatbelt assemblies 18 include a belt or webbing 20, a retractor 22 that spools the webbing 20, a buckle (shown generally at 24) that is selectively engageable with a latch 26 coupled to the webbing 20, and a turning loop 30 that routes the webbing 20. The retractor 22 is coupled to the seat bottom 12, seatback 14, or any other suitable location on the seat or vehicle body. The retractor 22 is spring loaded to wind the webbing 20 around a spool. The webbing 20 extends upward out of the retractor 22, over the turning loop, and back down to be anchored near the seat base. A latch 26 is provided on the webbing 20 and is allowed to slide along the webbing 20. To fasten the seatbelt, an occupant pulls the latch 26 across his or her body and inserts the latch 26 into one of the buckles 24 (such as buckles 51 or 52). The webbing 20 forms a waist portion across the waist or lap of the occupant and a shoulder portion across the chest of the occupant.

However, the vehicle in which the bench seat is provided may transport a wide variety of passengers, from small children to grown adults. The shoulder portion of the webbing 20 is intended to pass over the collarbone of the occupant. A seatbelt assembly that is configured for an adult may not be safe for a small child to use, and a seatbelt assembly that is configured for a small child may not be safe for an adult. An adjustable turning loop assembly 30 (see FIG. 3A) is configured to be slidable in a generally vertical direction to adjust the position of the turning loop 30 so that the webbing 20 is properly placed for a multitude of differently sized occupants.

Referring still to FIGS. 1 and 2, according to an exemplary embodiment, the bench seat 10 includes three seatbelt assemblies 18. For Example, in FIGS. 1 and 2, two outer seatbelt assemblies 32 and a middle seatbelt assembly 33 are shown (referring to both the outer and middle seatbelt assemblies generally as 18). Outer seatbelt guide assemblies 32 include adjustable turning loop assemblies 30 and the middle seatbelt assembly 33 includes a fixed turning loop 34 that is configured for a child. Alternatively, the middle seatbelt assembly 33 may be an adjustable turning loop assembly.

Figure 3A:
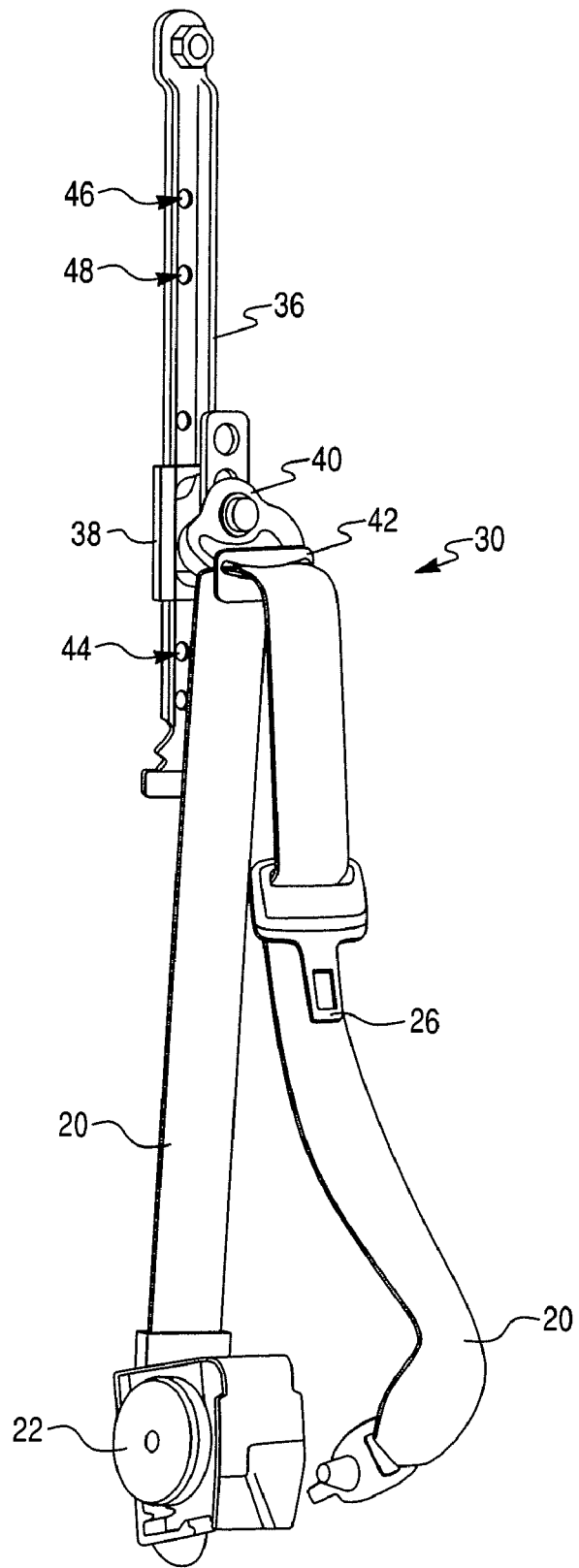
FIG. 3A is an isometric view an adjustable turning loop on a rail for the bench seat frame of FIG. 1 according to an exemplary embodiment.

Referring to FIG. 3A, an adjustable turning loop assembly 30 is shown according to an exemplary embodiment. The adjustable turning loop assembly 30 includes a rail 36 that is coupled to the seat frame, a slider assembly 38 that is coupled to the rail 36, and a guide loop or "D-ring" 40 that is coupled to the slider assembly 38 and receives the webbing 20. The rail 36 is an elongated member that is oriented generally vertically and coupled to the seatback frame 14. The slider assembly 38 is slidably coupled to the rail 36. The guide loop 40 is coupled to the slider assembly 38 and includes a U-shaped arm 42 that receives the webbing 20. The slider assembly 38 and guide loop 40 move up and down the rail 36 to move the webbing 20 in order to accommodate occupants of different sizes. Alternatively, any suitable number of seatbelts and adjustable turning loops 30 may be used on the same seat 10.

Figure 3B:
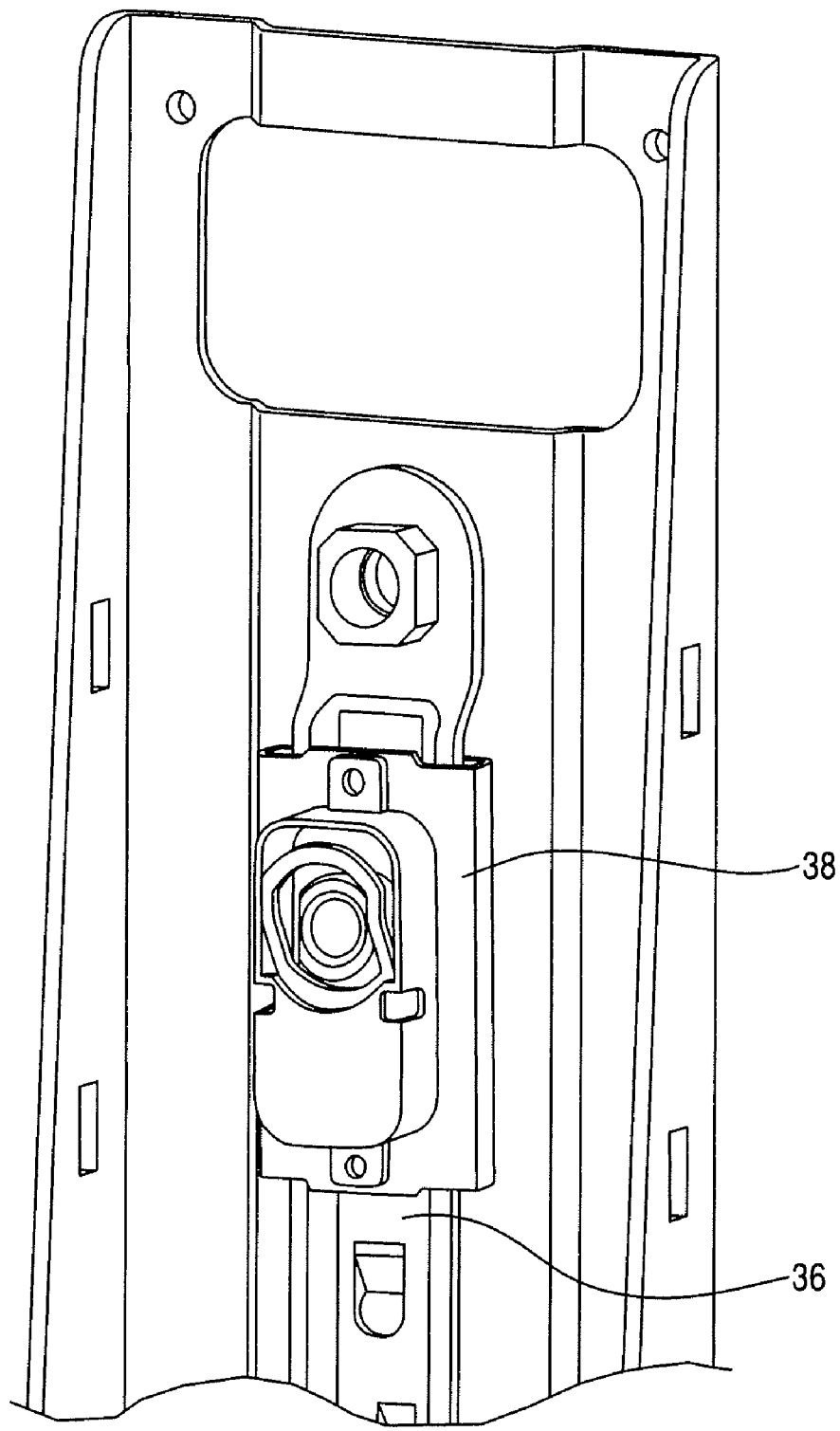
FIG. 3B is a detail rear view of a slider for the adjustable turning loop and rail of FIG. 3A.
Figure 3C:
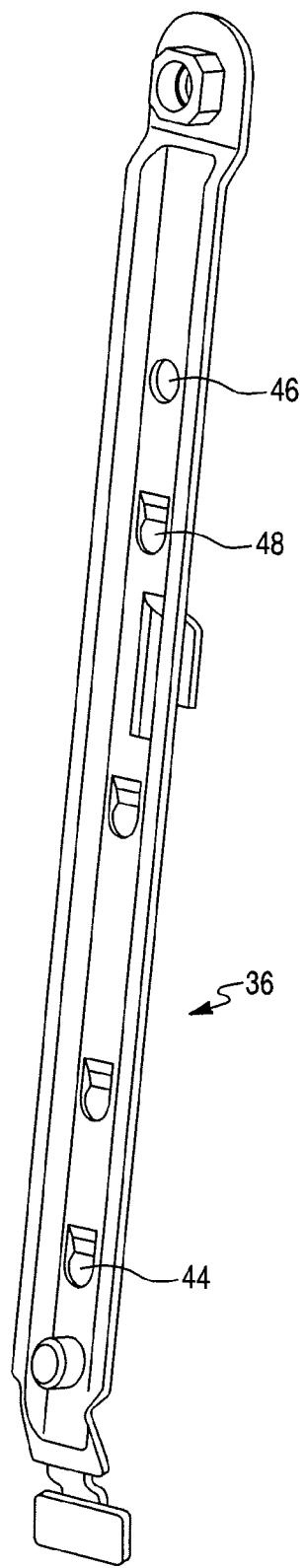
FIG. 3C is an isometric view of a rail according to an embodiment.
Figure 3D:
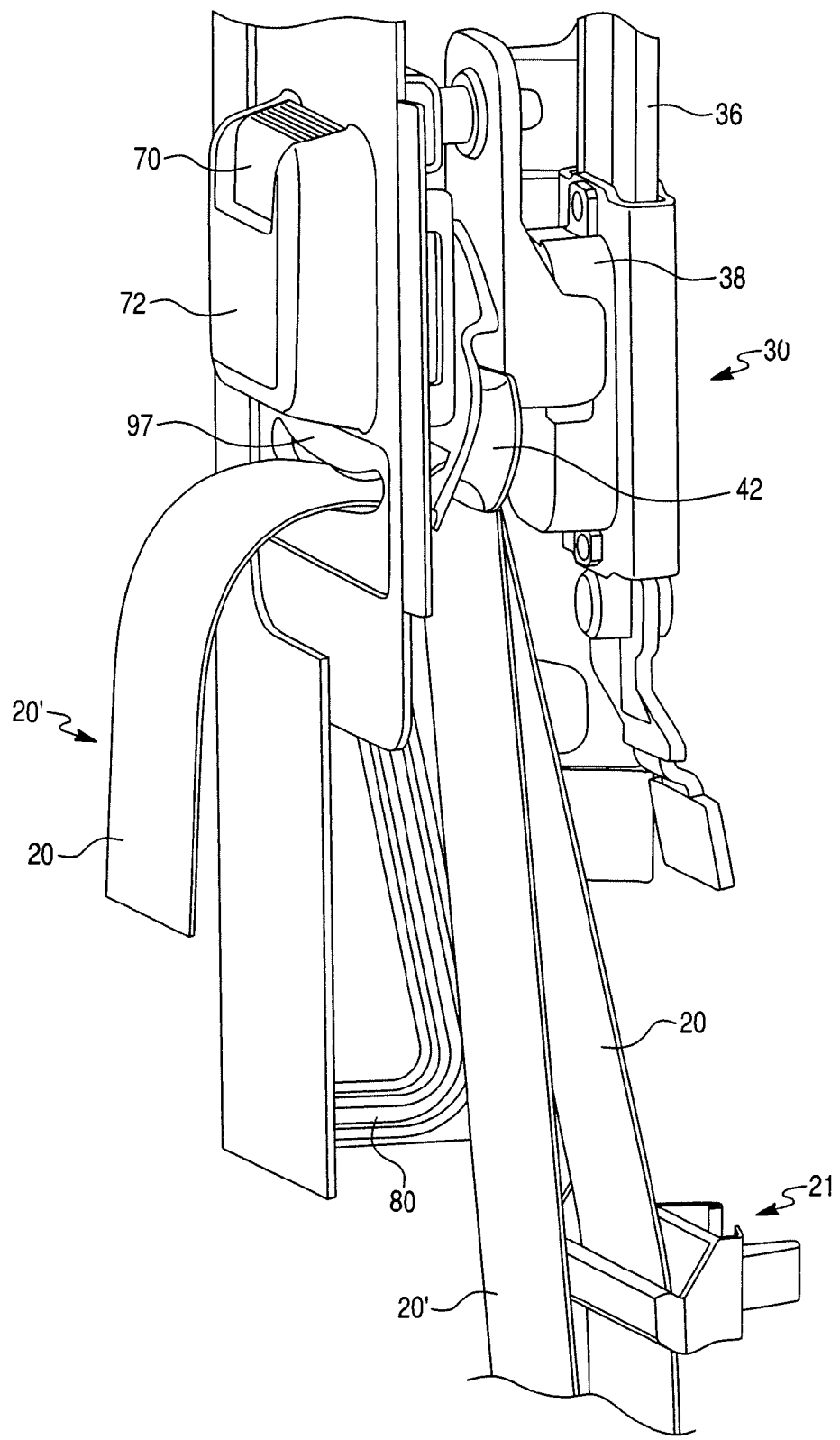
FIG. 3D is a detail isometric view of the adjustable turning loop of FIG. 3A in which a seatbelt webbing is shown with and without an intermediate web guide.

FIG. 3B illustrates a rear (interior) view of the slider assembly 38 coupled to the rail 36. FIG. 3D illustrates a side sectional view of the adjustable turning loop assembly 30, seatbelt webbing 20 and rail 36. In FIG. 3D, the webbing 20 is shown passing through the adjustable turning loop assembly 30 at a webbing bezel 97, extending through the arm 42 (D-ring) and downwards through an intermediate webbing guide 21. The intermediate webbing guide 21 positions the webbing 20 away from the track 80 so as to minimize any interference between the webbing 20 and the slider assembly 38 in the track 80. For exemplary purposes only, webbing 20' is shown which does not extend through the intermediate webbing guide 21. It will be recognized that only piece of webbing 20 or 20' will extend downwards from the arm 42. Both are shown in FIG. 3D for illustrative purposes only.

According to one exemplary embodiment, the slider assembly 38 has a travel distance of about 315 mm. It will be recognized that the slider assembly 38 may have a travel distance greater than or less than 315 mm. According to an exemplary embodiment, the rail 36 includes one or more discrete positions or stops for the slider assembly 38. The slider assembly 38 may have a latch (not shown) or catch that is configured to selectively engage the stops to stop the slider assembly 38 from sliding at discrete positions along the rail 36. A first stop 44 is proximate to the bottom of the rail 36 and is theoretically configured to adjust the seatbelt to be at an appropriate position for an average 6 year-old child. A second stop 46 is proximate to the top of the rail 36 and is configured to theoretically adjust the belt to a position appropriate for a 50th percentile male. A third stop 48 is between the first stop 44 and the second stop 46 and is configured to theoretically adjust the belt to a position appropriate for a 5th percentile female. According to other exemplary embodiments, fewer or additional stops may be provided along the rail 36 to accommodate different size occupants. FIG. 3C illustrates the rail 36. The slider assembly 38 and guide loop 40 move up and down the rail 36 and will stop and releasably lock at any one of a number of stop positions. For example, in FIG. 3C, several stop positions are shown, such as first stop 44, second stop 46, and third stop 48. According to exemplary embodiments, the rail 36 may be shorter or longer to alter the positions available for the adjustable turning loop 30 as required for the particular seat 10 and/or particular seat occupant(s).

Figure 4:
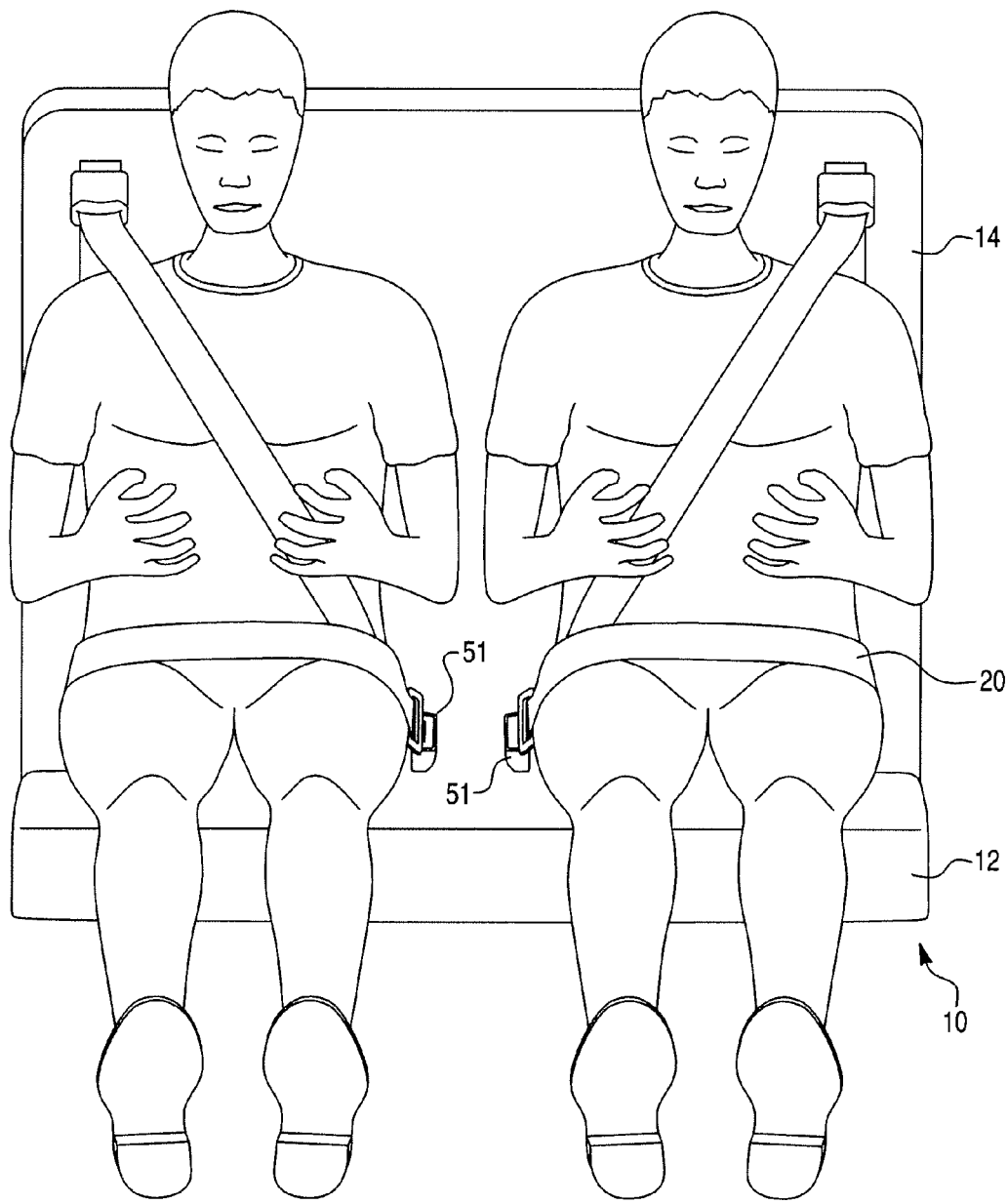
FIG. 4 is a front view of the bench seat of FIG. 1 with two larger occupants.
Figure 5:
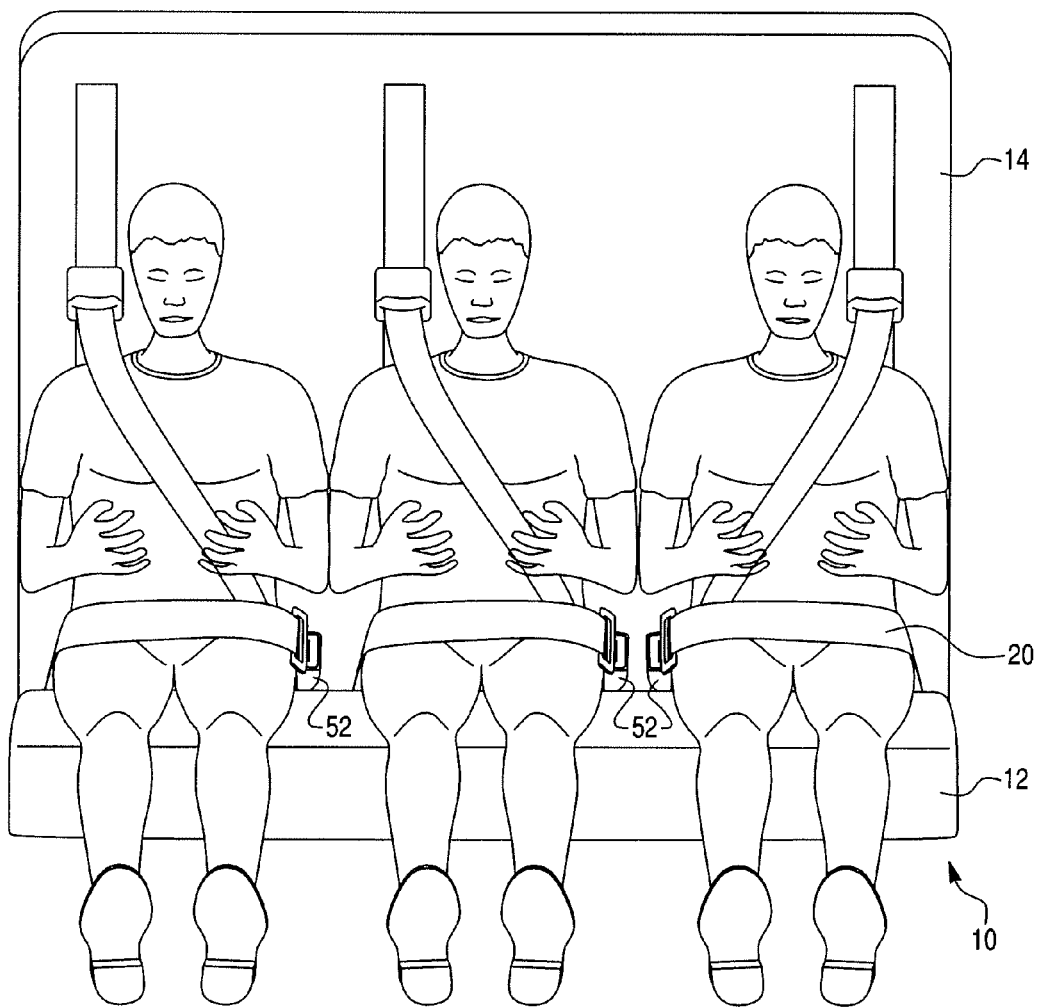
FIG. 5 is an isometric view of the bench seat of FIG. 1 with three smaller occupants.

Referring to FIG. 4, a bench seat 10 is shown with two adult occupants. Latches 26 for the two outside adjustable seatbelt guide assemblies are received by first buckles 51 that are provided proximate to the middle of the bus seat. Referring to FIG. 5, the same bench seat is shown with three child occupants. Second buckles 52 are provided to receive latches 26 from seatbelt assemblies 18.

Figure 6A:
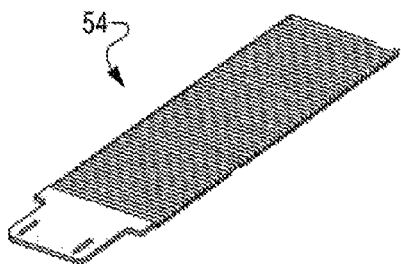
FIG. 6A is an isometric view of a rolling style adjustable turning loop cover according to an exemplary embodiment.
Figure 6B:
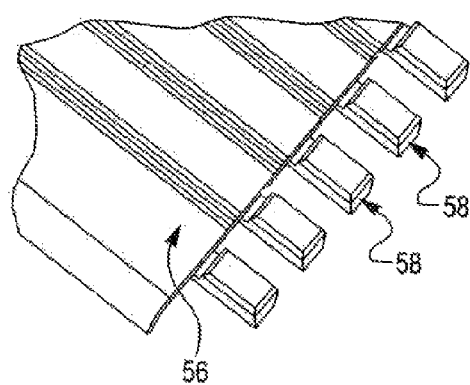
FIG. 6B is a close-up view of a rolling style adjustable turning loop cover of FIG. 6A.
Figure 6C:
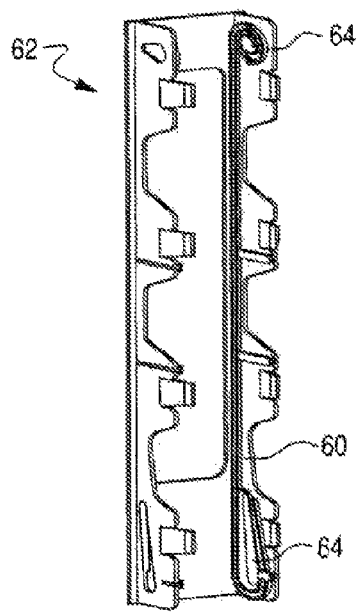
FIG. 6C is an isometric view of the interior of the rolling style adjustable loop cover.
Figure 7A:
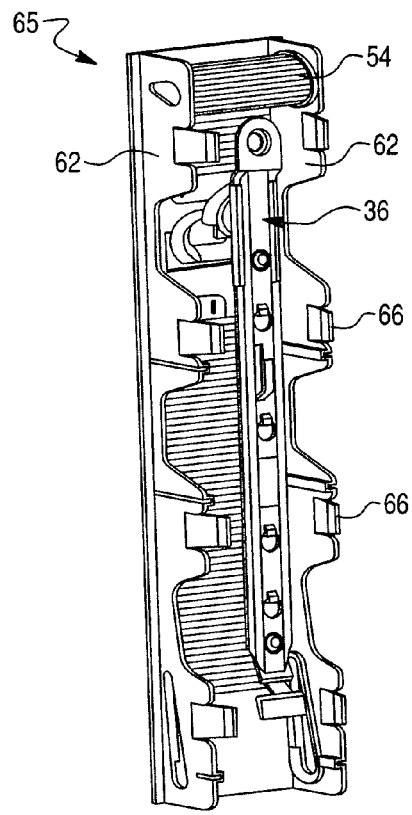
FIG. 7A is an isometric view of the interior of a seatbelt guide unit module according to an exemplary embodiment with a rolling style adjustable loop cover and rail.
Figure 7B:
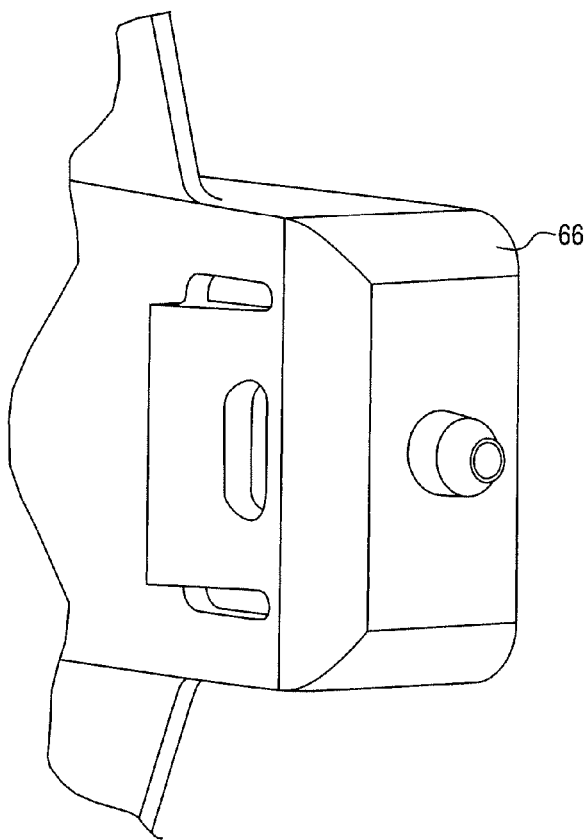
FIG. 7B is a detail view of a snap feature taken from FIG. 7A.

Referring to FIGS. 6A-6C, a cover 54 for the adjustable turning loop assembly 30 is shown according to an exemplary embodiment. In this embodiment, cover 54 is a flexible panel that is comprised of continuous, flexible segments 56 and rigid pins 58 that move along two guide tracks 60 located on both sides of the interior of the cover housing 62 (FIG. 6B). The cover 54 may be comprised of any flexible plastic polymer, such as TPO, TEO, etc. The rigid pins 58 may be comprised of metal or plastic such as, for example, ABS. At the top end of the cover housing 62, the guide track 60 is a compact and oval-shaped guide track 64 provided to minimize space requirements for the storage of cover 54 when in a full "up" position 61. At the bottom end of the cover housing 62, guide track 60 rolls into a second oval shaped guide track 64 when in the full "down" to prevent interference between the rolled cover 54 and the seatbelt webbing 20 routing behind the cover housing 62. The cover 54 and cover housing 62 combine to form a seatbelt guide unit module 65 (shown in FIGS. 7A, 8A, 8B). In an embodiment, two cover sections 54 (an upper and a lower) are used. Each cover section 54 is positioned on an opposite side of the turning loop 30.

Referring still to FIG. 7A-8B, the rolling style cover 54 assembled to housing 62 is shown. Snap-in features 66 (FIG. 7B) are positioned on housing 62 for assembly to the seat frame 10. A guide track 60 guides the movement of the continuous, folding covers 54 from top to bottom. A D-ring 68 guides the seatbelt webbing 20. The covers 54 also include a button 70 and a button cover 72 that is spring loaded and can be activated by the seat occupant to control the vertical position of the turning loop assembly 30 along the adjustable turning loop rail 36 are also shown. The folding, continuous cover 54 requires minimum tooling action and provides simple assembly. The use of thermoplastic olefin ("TPO"), thermoplastic elastomer ("TPE"), etc., material provides a durable, flexible product with no welds, etc. and can be adapted to seat and pillar mounted adjustable turning loop designs.

Figure 8A:
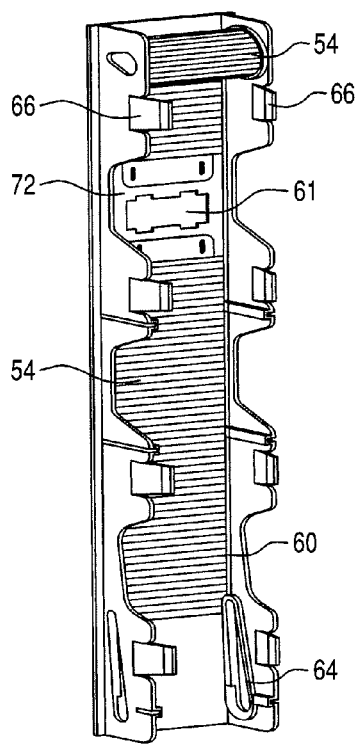
FIG. 8A is an interior view of a rolling style adjustable turning loop cover assembly in a full "up" position.
Figure 8B:
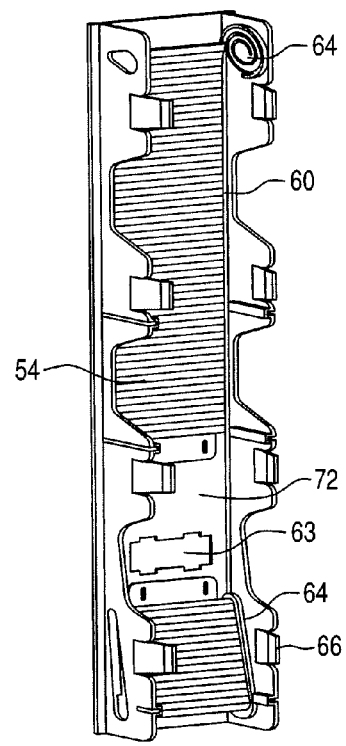
FIG. 8B is an interior view of a rolling style adjustable turning loop cover assembly in a full "down" position.

Referring to FIGS. 8A-8B, an interior view of the cover 54 and housing 62 is shown. FIG. 8A illustrates the cover in the full "up" position 61, or the uppermost stop 46 along rail 36 as shown in FIG. 3. FIG. 8B illustrates the full "down" position 63, or the lowermost stop 44 along rail 36 as shown in FIG. 3A.

Figure 9A:
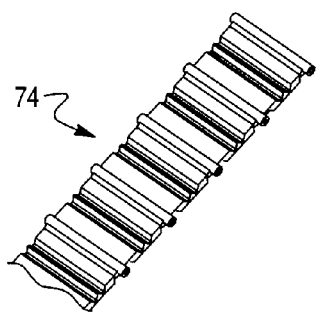
FIG. 9A is an isometric view of an accordion style (also called "folding" style) folding adjustable loop cover according to an exemplary embodiment.
Figure 9B:
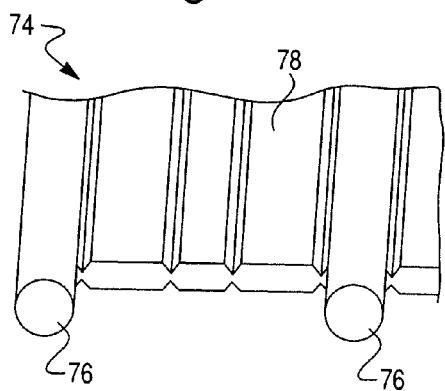
FIG. 9B is a close-up view of sliding pins contained in the accordion style adjustable turning loop cover.
Figure 9C:
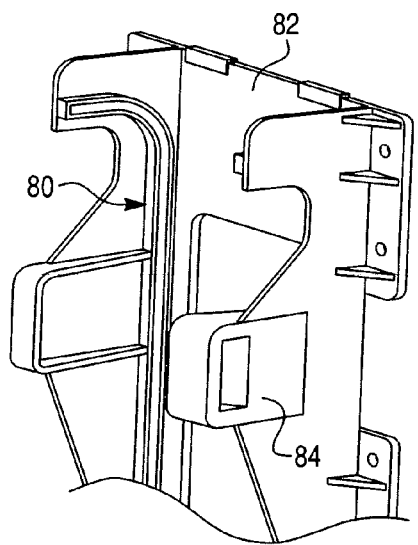
FIG. 9C is an isometric view of an interior guide track on the accordion style adjustable turning loop cover of FIG. 9A.
Figure 9D:
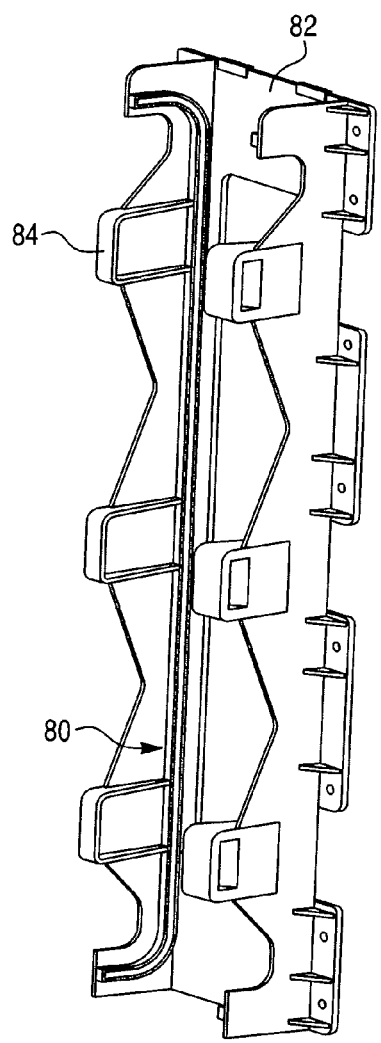
FIG. 9D is an interior view of the accordion style adjustable turning loop cover of FIG. 9A.
Figure 9E:
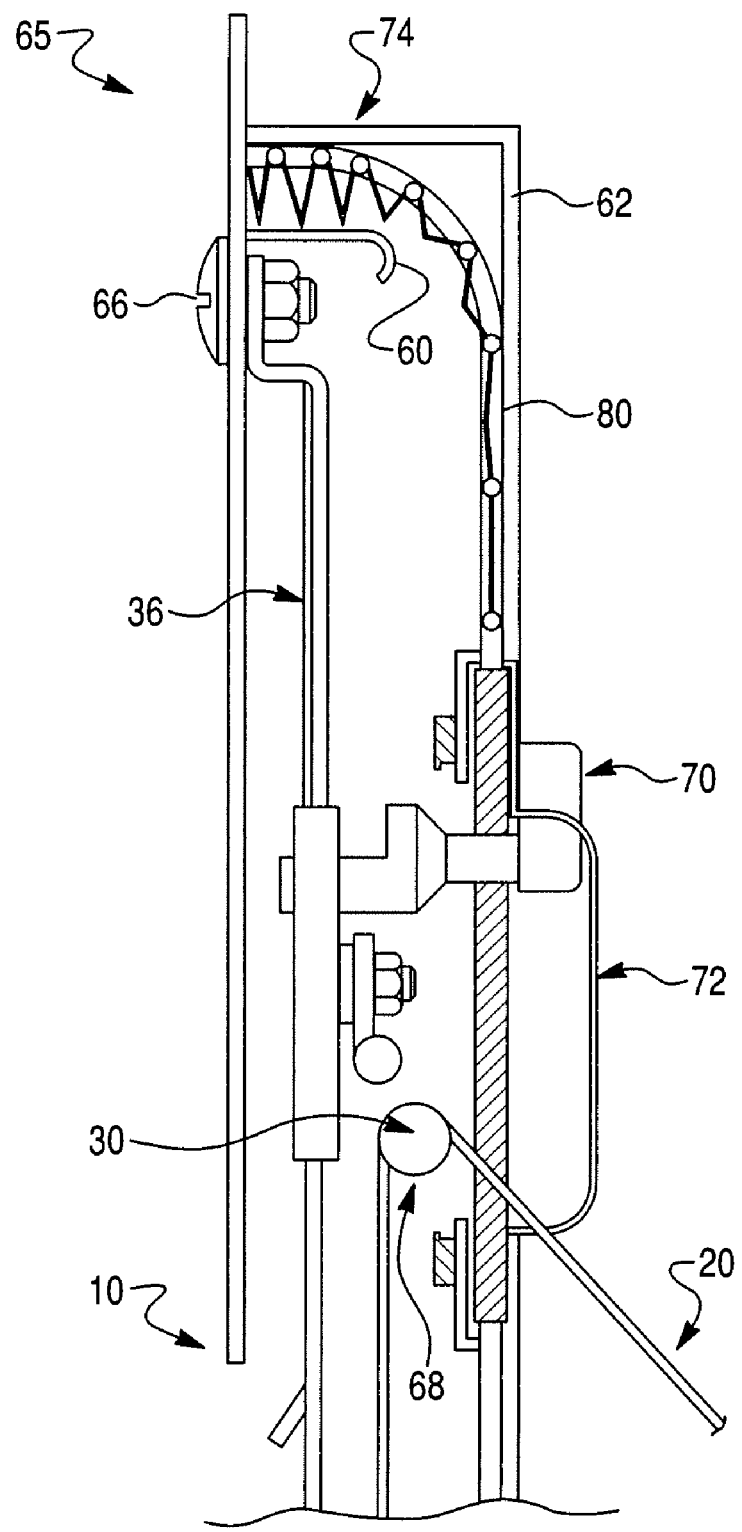
FIG. 9E is a sectional side view of a seatbelt guide unit module with the accordion style folding adjustable loop cover of FIG. 9A.

In another embodiment, as illustrated in FIGS. 9A-9F, the adjustable turning loop continuous folding cover is an "accordion-style" cover 74. In this embodiment, molded-in dowel type sliding pins 76 are incorporated into the flexible segments 78 of the cover panel 74. These pins 76 can be metal or plastic, such as ABS. The cover panel 74 moves along a guide track 80 in the cover housing 82. Snap-in features 84 are positioned on housing 82 for assembly to the seat frame 10 (shown in FIGS. 1-2). In FIG. 9F, an alternative cover panel 74' is shown with flexible segments and sliding pins.

Figure 10A:
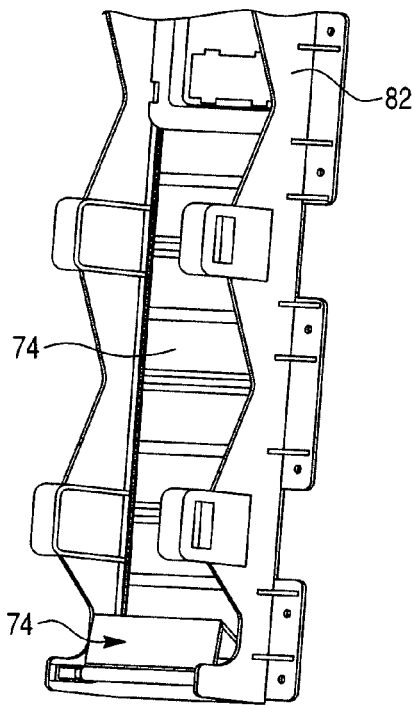
FIG. 10A is an isometric view of the interior of an accordion style adjustable turning loop cover assembly.
Figure 10B:
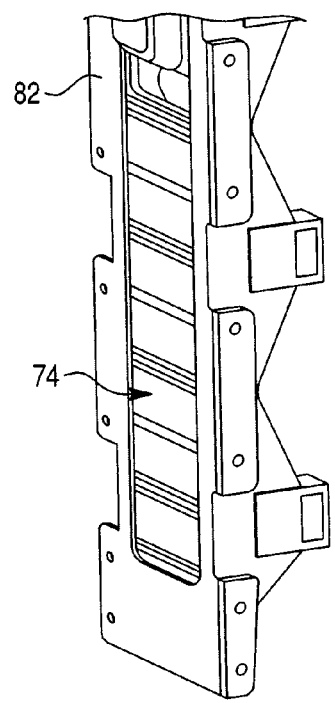
FIG. 10B is an exterior view of an accordion style adjustable turning loop cover assembly.
Figure 10C:
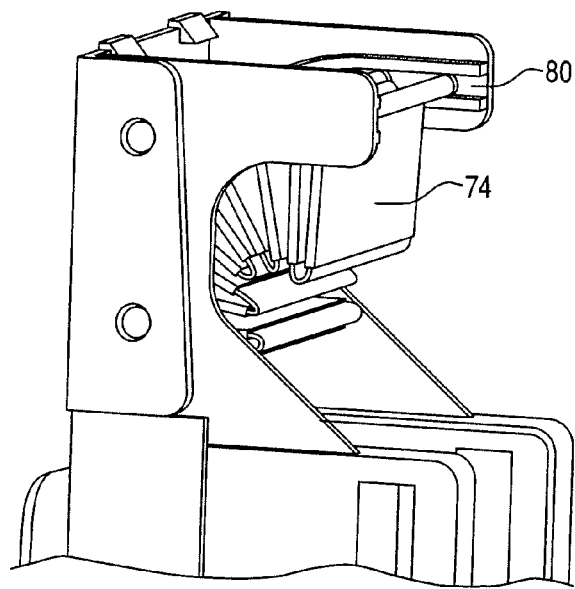
FIG. 10C is an interior view of the accordion style adjustable turning loop cover.

FIGS. 10A-10C illustrate the arrangement of the "accordion-style" cover. In FIG. 10A, the cover panel 74 is shown partially folded and stored at the bottom of the housing 82. FIG. 10B shows the exterior of the cover panel 74 illustrating how the cover 74 remains approximately flush to the surface of the housing 82 and, therefore, resistant to tampering and debris, and preventing access to the interior of the adjustable turning loop assembly (not shown) by occupants of the seat 10. FIG. 10C is an interior view of the "accordion-style" cover panel 74 fully folded with the adjustable turning loop (not shown) in the full "up" position 61, or the uppermost stop 46 along rail 36 as shown in FIG. 3.

Figure 11A:
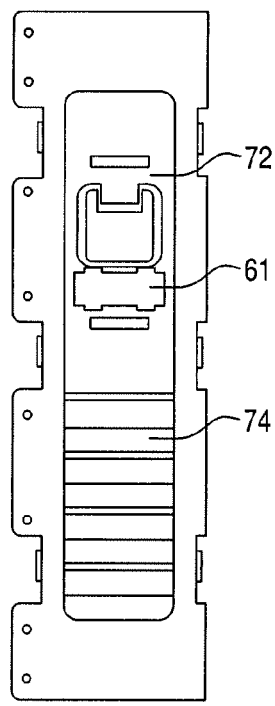
FIG. 11A is a front view of an adjustable loop cover in the full "up" position.
Figure 11B:
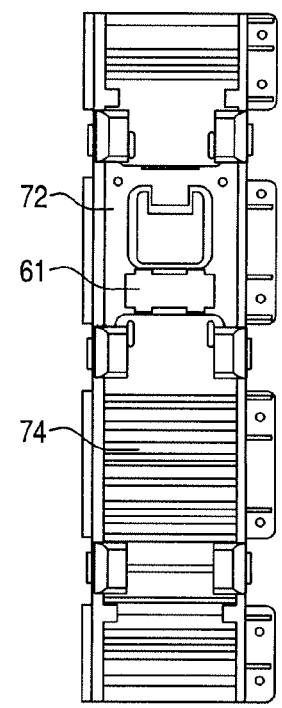
FIG. 11B is an interior view of an adjustable loop cover in the full "up" position.
Figure 11C:
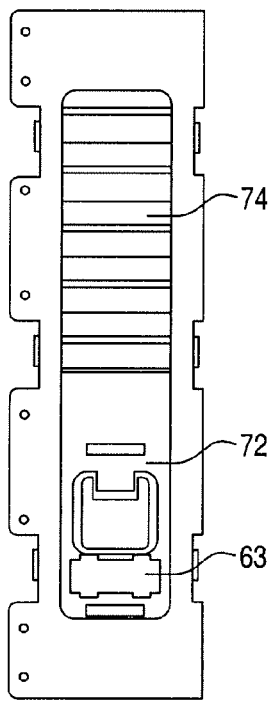
FIG. 11C is a front view of an adjustable loop cover in the full "down" position.
Figure 11D:
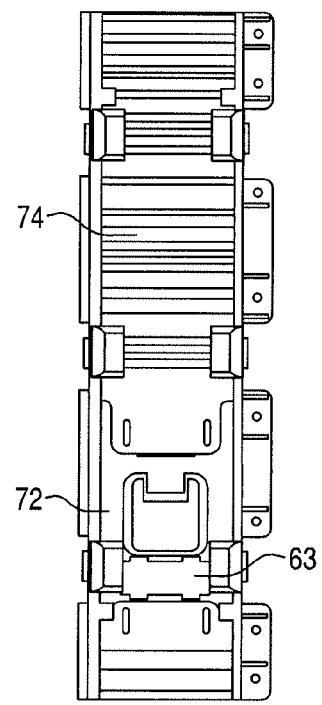
FIG. 11D is an interior view of an adjustable loop cover in the full "down" up position.

FIG. 11A illustrates the front view of the adjustable loop cover in the full "up" position 61. FIG. 11B illustrates the interior view of the adjustable loop cover in the full "up" position 61. FIG. 11C illustrates the front view of the adjustable loop cover in the full "down" position 63. FIG. 11D illustrates the interior view of the adjustable loop cover in the full "down" position 63, showing how the cover 74 folds upon itself in a compact manner.

Figure 12:
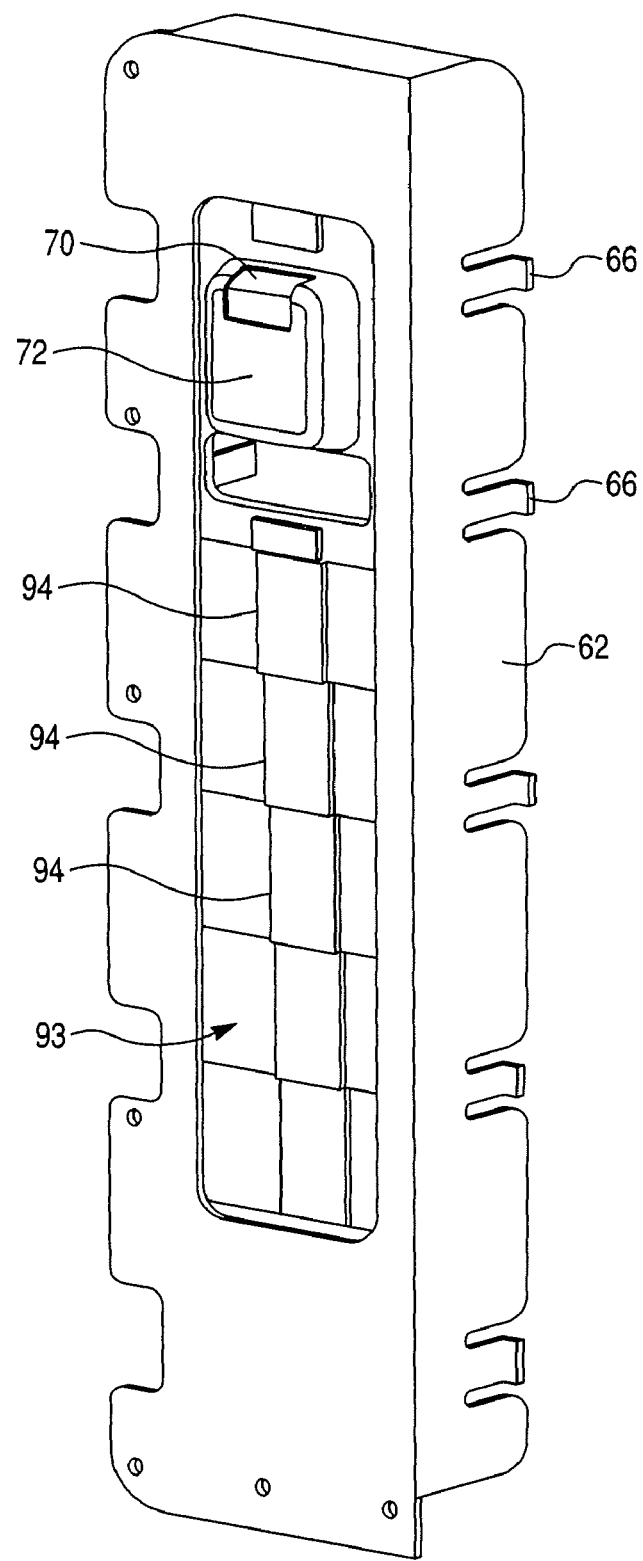
FIG. 12 is a front isometric view of a sliding type adjustable turning loop assembly and housing according to another embodiment.
Figure 13A:
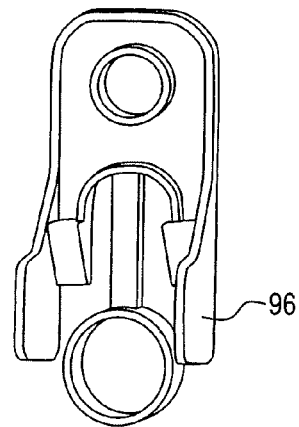
FIGS. 13A-13G are detail views of components of the sliding type adjustable turning loop assembly of FIG. 12.
Figure 13B:
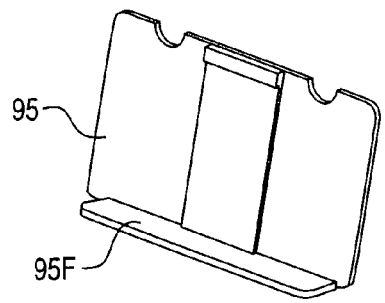
Figure 13C:
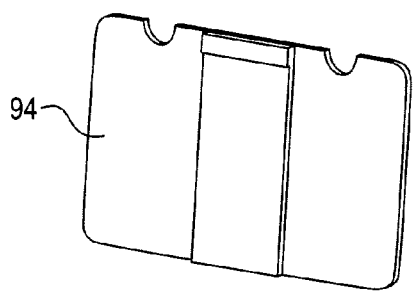
Figure 13D:
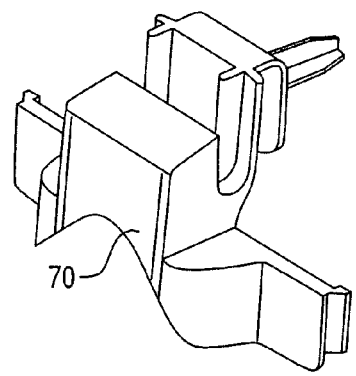
Figure 13E:
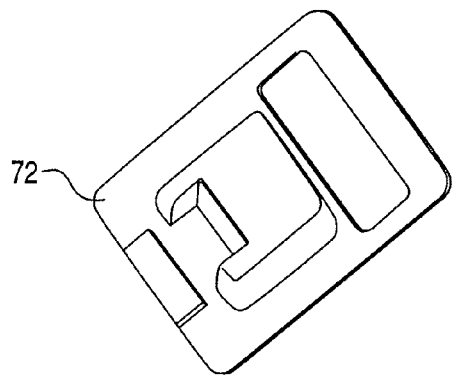
Figure 13F:
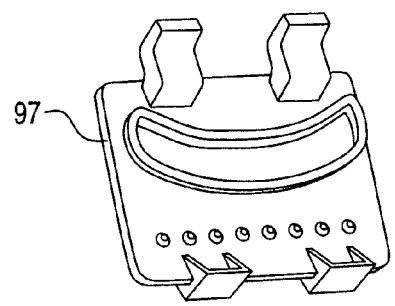
Figure 13G:
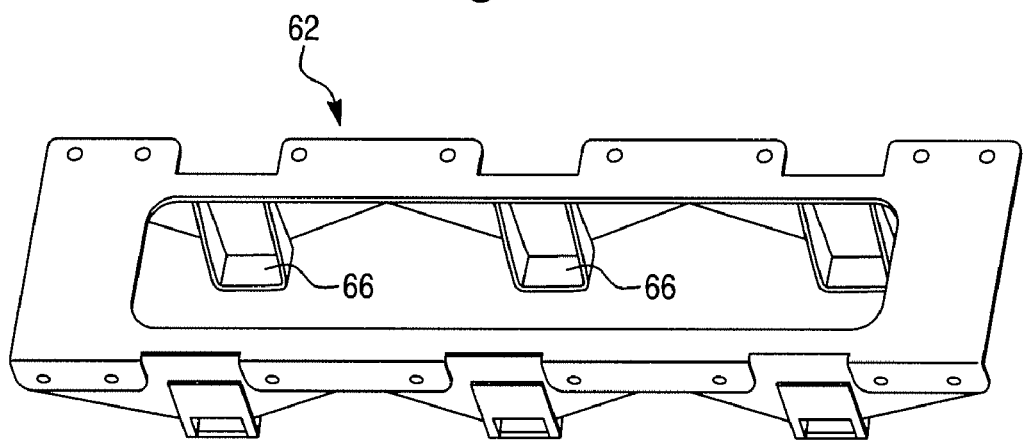
Figure 14:
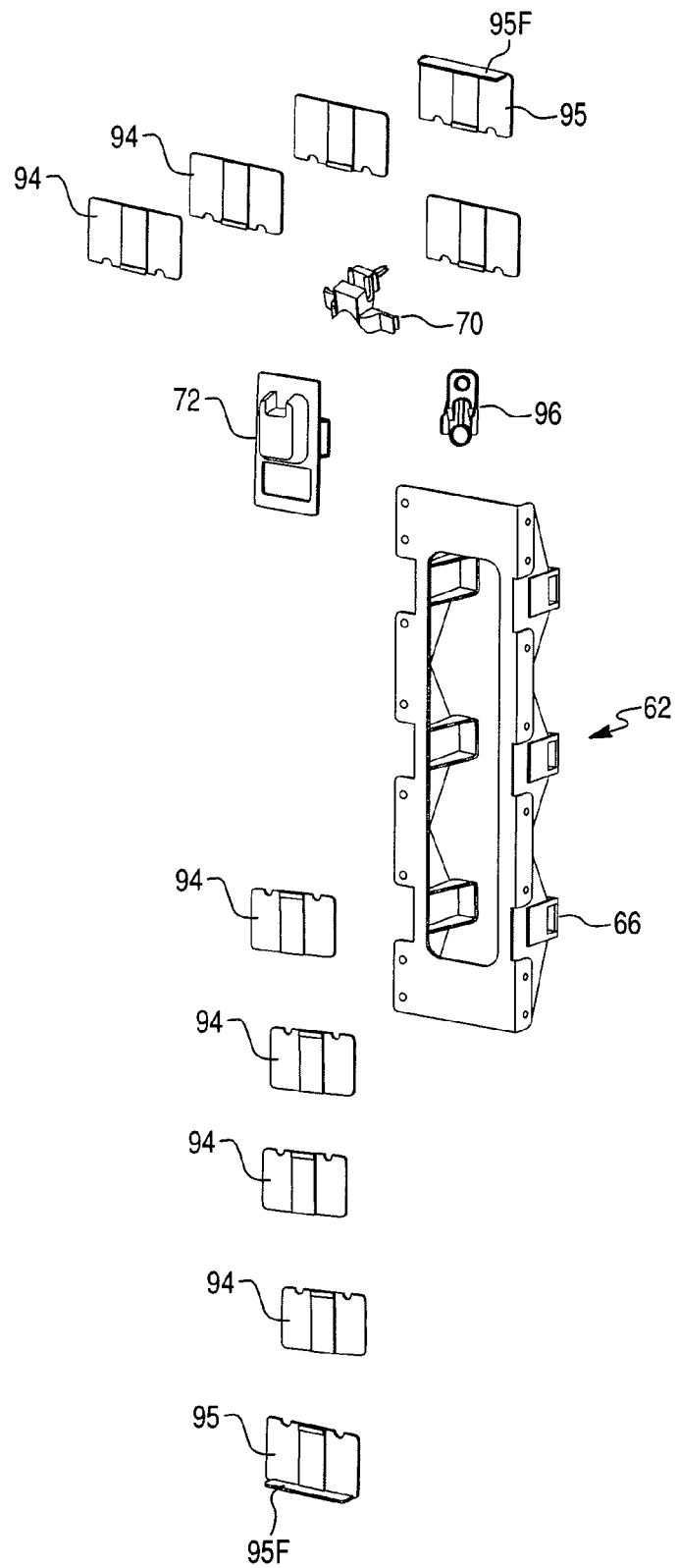
FIG. 14 is an exploded view of the sliding type adjustable turning loop assembly of FIG. 12.

Referring now to FIGS. 12-14, an adjustable turning loop assembly 30 with a sliding plate-type cover 93 is shown. In FIG. 12, the sliding plate-type cover 93 includes a plurality of stackable, sliding plates 94 that move upwards and downward upon depressing a button 70 in the button housing 72. FIGS. 13A-13G illustrate various components of the sliding plate-type embodiment. The plates 94 are moved along a track within the housing 62 via an actuator 96. The plates 94 are coupled to the actuator 96 which is positioned proximate to the button 70. As the button 70 is depressed allowing a slider assembly 38 to move, the actuator moves 96 and pulls the plates 94 one on top of each other to stack. The stacking action allows the slider assembly 38 to move. A sliding trim plate 95 (FIG. 13B) is coupled to both ends of the cover 93. The trim plate 95 includes a flange 95F that covers a gap between the housing 62 and bottom-most or top-most sliding plate 94. Because the plates 94 stack, the plates 94 are offset from each other, creating a gap at the bottom and top of the line of plates 94. The flange 95F of the trim plate 95 covers this gap. A webbing exit bezel 97 is shown in FIG. 13F. Webbing 20 extends out of the adjustable turning loop assembly 30 and out through the housing 62 via the webbing exit bezel 97.

It is important to note that the construction and arrangement of the adjustable turning loop for bench type seating and cover as shown in the various exemplary embodiments are illustrative only. Although only a few embodiments have been described in detail in this disclosure, those skilled in the art who review this disclosure will readily appreciate that many modifications are possible (e.g., variations in sizes dimensions, structures, shapes and proportions of the various elements, values of parameter, mounting arrangements, use of materials, colors, orientations, etc.) without materially departing from the novel teachings and advantages of the subject matter recited in the description. For example, elements shown as integrally formed may be constructed of multiple parts or elements, the position of the elements may be reversed or otherwise varied, and the nature or number of discrete elements or positions may be altered or varied. Other substitutions, modifications, changes and omissions may be made in the design, operating conditions and arrangement of the exemplary embodiments.

What is claimed is:

1. A seatbelt guide unit module, comprising:
    an adjustable turning loop assembly that includes:
        a housing;
        a rail;
        a slider assembly coupled to the rail;
        a seatbelt guide loop device coupled to the slider assembly, the guide loop device being configured to receive seatbelt webbing;
        a movable cover for the turning loop assembly; and
        a cover track, wherein the cover moves along the cover track in the housing,
    wherein the cover is a continuous cover configured to hide components of the adjustable turning loop assembly from view within a passenger compartment in a vehicle.

2. The seatbelt guide unit module of claim 1, wherein the cover is a rolling cover that includes a flexible rolling cover portion and a plurality of rigid pins.

3. The seatbelt guide unit module of claim 1, wherein the cover is movable between a fully "up" position where the slider assembly is at a topmost location and a fully "down" position where the slider assembly is at a bottommost location.

4. The seatbelt guide unit module of claim 1, wherein the housing is attached to a vehicle seat or a vehicle body component.

5. The seatbelt guide unit module of claim 1, wherein the cover is a continuous, folding cover.

6. The seatbelt guide unit module of claim 1, further including an upper storage area for the cover; and a lower storage area for the cover.

7. The seatbelt guide unit module of claim 6, wherein the cover includes a plurality of segments and sliding pins, and wherein the cover folds up into an accordion type shape at the upper storage area when the cover is in a fully up position.

8. The seatbelt guide unit module of claim 6, wherein the cover comprises a plurality of slidable plates.

9. The seatbelt guide unit module of claim 8, wherein the upper storage area includes a first track storage area on which the cover stacks up into when the cover is in a fully up position.

10. The seatbelt guide unit module of claim 9, wherein the lower storage area includes a second track storage area on which the cover stacks up into when the cover is in a fully down position.

11. The seatbelt guide unit module of claim 6, wherein the upper storage area includes a first track storage area on which the cover rolls up into when the cover is in a fully up position.

12. The seatbelt guide unit module of claim 11, wherein the lower storage area includes a second track storage area on which the cover rolls into when the cover is in a fully down position.

13. The seatbelt guide unit module of claim 12, wherein the second track storage area is configured to prevent interference between the cover and the seatbelt webbing.

14. The seatbelt guide unit module of claim 12, wherein the second track storage area has a different configuration than the first track storage area.

15. The seatbelt guide unit module of claim 14, wherein the cover includes a living hinge between segments.

16. A bench-type seat for a vehicle, comprising:
    a seatback;
    a seat bottom;
    at least one adjustable turning loop assembly such that a turning loop is capable of moving from a topmost position proximate a top of the seatback down to a lower portion of the seatback;
    wherein the adjustable turning loop assembly includes:
        a rail coupled to the seat frame;
        a slider assembly coupled to the rail;
        a loop pivot device coupled to the slider assembly, the loop pivot device receives seatbelt webbing;
        a housing; and a cover assembly to prevent access to an interior of the adjustable turning loop assembly.

17. The bench-type seat of claim 16, wherein the seat includes a recessed opening for at least one turning loop assembly, the turning loop assembly being adjustable or fixed.

18. The bench-type seat of claim 16, further comprising a first set of buckles to receive a corresponding latch from a seatbelt; and a second set of buckles to receive a corresponding latch from a seatbelt.

19. The bench-type seat of claim 18, wherein the first set of buckles includes two buckles, and wherein the buckles correspond to two adjustable turning loop assemblies.

20. The bench-type seat of claim 18, wherein the second set of buckles includes three buckles, and wherein the buckles correspond to two adjustable turning loop assemblies and a single fixed loop assembly.

21. The bench-type seat of claim 20, wherein the single fixed loop assembly is positioned in a middle portion of the seat in a lateral direction and a topmost position of the single fixed loop assembly is located in a middle portion of the seat in a longitudinal direction.

22. The bench-type seat of claim 16, wherein the cover assembly includes a guide track and a movable cover, the movable cover moves along the guide track.

23. The bench-type seat of claim 22, wherein the cover is a rolling cover that includes a flexible rolling cover portion and a plurality of rigid pins.

24. The bench-type seat of claim 22, wherein the cover includes a plurality of slidable plates.

25. The bench-type seat of claim 22, wherein the cover is movable between a fully up position where the slider assembly is at a topmost location and a fully down position where the slider assembly is at a bottommost location.

26. The bench-type seat of claim 22, wherein the housing includes an upper storage area with a first track storage area on which the cover moves up into when the cover is in a fully up position.

27. The bench-type seat of claim 26, wherein the housing includes a lower storage area with a second track storage area on which the cover moves down into when the cover is in a fully down position.

28. The bench-type seat of claim 26, wherein the cover includes a plurality of segments and sliding pins, and wherein the cover folds up into an accordion type shape at the upper storage area when the cover is in a fully up position.

29. The bench-type seat of claim 28, wherein the cover includes a living hinge between segments.

30. A seatbelt guide unit module, comprising:
an adjustable turning loop assembly that includes:
a housing;
a rail;
a slider assembly coupled to the rail;
a seatbelt guide loop device coupled to the slider assembly, the guide loop device being configured to receive seatbelt webbing;
a movable cover for the turning loop assembly; and
a cover track, wherein the cover moves along the track in the housing,
wherein the cover is a movable cover configured to hide components of the adjustable turning loop assembly from view within a passenger compartment in a vehicle.

31. The seatbelt guide unit module of claim 30, wherein the cover comprises a plurality of offset, slidable plates.

32. The seatbelt guide unit module of claim 31, wherein the plates overlap and stack upon each other when the turning loop assembly moves upward or downward.

33. The seatbelt guide unit module of claim 31, further comprising a trim plate with a flange configured to cover a gap formed by the offset plates.

* * * * *